United States Patent
Xiao et al.

(10) Patent No.: US 12,507,116 B2
(45) Date of Patent: Dec. 23, 2025

(54) USER EQUIPMENT AND METHOD THEREOF, AND BASE STATION AND METHOD THEREOF

(71) Applicant: Sharp Kabushiki Kaisha, Sakai (JP)

(72) Inventors: FangYing Xiao, Shanghai (CN); Renmao Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 425 days.

(21) Appl. No.: 17/780,574

(22) PCT Filed: Nov. 27, 2020

(86) PCT No.: PCT/CN2020/132183
§ 371 (c)(1),
(2) Date: May 27, 2022

(87) PCT Pub. No.: WO2021/109933
PCT Pub. Date: Jun. 10, 2021

(65) Prior Publication Data
US 2023/0007531 A1 Jan. 5, 2023

(30) Foreign Application Priority Data
Dec. 6, 2019 (CN) .......................... 201911254116.7

(51) Int. Cl.
*H04W 28/06* (2009.01)
*H04W 76/15* (2018.01)
*H04W 80/02* (2009.01)

(52) U.S. Cl.
CPC .......... *H04W 28/06* (2013.01); *H04W 76/15* (2018.02); *H04W 80/02* (2013.01)

(58) Field of Classification Search
CPC ..... H04W 28/06; H04W 76/15; H04W 80/02; H04L 1/18; H04L 1/1829; H04L 1/1864; H04L 1/1867; H04L 1/1896
See application file for complete search history.

(56) References Cited

U.S. PATENT DOCUMENTS

| | | | |
|---|---|---|---|
| 10,667,165 B2* | 5/2020 | Yi | H04L 1/189 |
| 11,950,313 B2* | 4/2024 | Ingale | H04W 76/16 |
| 2016/0255551 A1* | 9/2016 | Susitaival | H04W 36/023 370/334 |

(Continued)

OTHER PUBLICATIONS

Official Communication issued in International Patent Application No. PCT/CN2020/132183, mailed on Mar. 3, 2021.
"3rd Generation Partnership Project; Technical Specification Group Radio Access Network; NR; Radio Resource Control (RRC) protocol specification (Release 16)", 3GPP TS 38.331 V16.1.0, Jul. 2020, pp. 1-906.
Nokia et al., "Revised SID: Study on NR Industrial Internet of Things (IoT)", 3GPP TSG RAN meeting #81, RP-182090, Sep. 10-13, 2018, 5 pages.

(Continued)

*Primary Examiner* — Redentor Pasia
(74) *Attorney, Agent, or Firm* — Keating & Bennett, LLP

(57) ABSTRACT

Provided in the present disclosure are user equipment and a method thereof, and a base station and a method thereof. A method performed by user equipment includes: receiving, from a base station, a medium access control control element (MAC CE) used to indicate an activation configuration of packet data convergence protocol (PDCP) duplication of a data radio bearer (DRB) and/or an associated radio link control (RLC) entity; and performing the activation configuration of the PDCP duplication and/or the associated RLC entity based on the MAC CE. Thus, the communication efficiency and reliability of a wireless communication system can be improved.

3 Claims, 3 Drawing Sheets

(56) References Cited

U.S. PATENT DOCUMENTS

| | | | | |
|---|---|---|---|---|
| 2016/0285716 A1* | 9/2016 | Pelletier | ............ | H04W 74/0833 |
| 2016/0323790 A1* | 11/2016 | Wang | .................... | H04L 5/0053 |
| 2018/0124843 A1* | 5/2018 | Shaheen | ............... | H04W 76/11 |
| 2019/0215717 A1 | 7/2019 | Lee et al. | | |
| 2019/0215719 A1* | 7/2019 | Wei | ........................ | H04W 28/06 |
| 2020/0100235 A1* | 3/2020 | Jo | ........................ | H04W 80/02 |
| 2020/0229036 A1* | 7/2020 | Tang | .................... | H04W 80/08 |
| 2020/0236734 A1* | 7/2020 | Wei | ........................ | H04W 80/02 |
| 2020/0252330 A1* | 8/2020 | Wei | ........................ | H04W 76/15 |
| 2020/0389867 A1* | 12/2020 | Zeng | ........................ | H04W 76/30 |
| 2021/0022032 A1* | 1/2021 | Kim | .................. | H04W 28/0252 |
| 2021/0051766 A1* | 2/2021 | Chen | .................... | H04L 5/0091 |
| 2021/0352762 A1* | 11/2021 | Dong | .................... | H04W 28/18 |
| 2024/0040426 A1* | 2/2024 | Zhang | ............... | H04W 28/0263 |

OTHER PUBLICATIONS

LG Electronics Inc., Consideration on RLC polling with multiple RLC entities, 3GPP TSG-RAN WG2 Meeting #102, R2-1808392, May 21-25, 2018, pp. 1-3.

LG Electronics Inc., "Introduction of PDCP duplication for LTE", 3GPP TSG-RAN2 Meeting #102, R2-1808537, May 21-25, 2018, 11 pages.

Ericsson, "Configuration and RRC aspects of PDCP Duplication", 3GPP TSG-RAN WG2 #108, Tdoc R2-1914760, Nov. 18-22, 2019, 9 pages.

\* cited by examiner

USER EQUIPMENT AND METHOD THEREOF, AND BASE STATION AND METHOD THEREOF

TECHNICAL FIELD

The present disclosure relates to the technical field of wireless communications. More specifically, the present disclosure relates to user equipment and a method thereof, and a base station and a method thereof.

BACKGROUND

In September 2018, at the 3rd Generation Partnership Project (3GPP) RAN #81 plenary meeting, Nokia proposed a research project on the 5G (or NR) industrial Internet of things (IIoT) (see non-patent literature: RP-182090: Revised SID: Study on NR Industrial Internet of Things (IIoT)) and the research project was approved. One of the goals of this research project is to improve the reliability of data transmission and reduce the time delay of data transmission by means of data duplication, specifically including: (1) resource-efficient PDCP duplication, such as avoiding unnecessary duplicate transmissions; and (2) implementing more than two PDCP duplications by using dual connectivity (DC) or carrier aggregation (CA).

In Release 15, a bearer that supports PDCP duplication can be configured with two RLC entities at most. The initial state of the bearer configured with PDCP duplication indicates whether the PDCP duplication function is initially activated by means of a pdcp-Duplication information element (see 3GPP TS38.331 for a detailed description of the information element). In carrier aggregation, for a bearer in which an initial PDCP duplication function is not activated, data of the bearer is transmitted by means of a logical channel indicated by a primaryPath information element (see 3GPP TS38.331 for a detailed description of the information element). In dual connectivity, for a bearer in which an initial PDCP duplication function is not activated, it is determined, according to the amount of data to be transmitted, whether the data is to be transmitted by means of a logical channel indicated by a primaryPath information element (see 3GPP TS38.331 for a detailed description of the information element) or by using a split bearer.

In NR IIoT, in order to achieve the goal of more than two PDCP duplications by means of dual connectivity or carrier aggregation, some manufacturers propose to configure a plurality of RLC entities for a bearer that supports PDCP duplication, but only activate a number of RLC entities thereamong each time. The network may indicate by means of RRC signaling or a medium access control control element (MAC CE) whether the PDCP duplication is activated and indicate an activated RLC entity. The present disclosure discusses relevant problems involved in configuring and/or activating and deactivating the PDCP duplication and/or the RLC entity.

SUMMARY

In order to solve the above problems in the prior art, provided in the present disclosure are user equipment and a method thereof, and a base station and a method thereof, capable of performing an activation configuration of an appropriate PDCP duplication and/or RLC entity based on information indicating the activation configuration of the PDCP duplication and/or RLC entity, so as to improve the communication efficiency and reliability of a wireless communication system.

According to a first aspect of the present disclosure, user equipment is provided, including a receiving unit, configured to receive an RRC message including a first indication and a second indication, the first indication indicating a first cell group and a first logical channel associated with a primary RLC entity of a radio bearer, the second indication indicating a second logical channel associated with a secondary RLC entity of the radio bearer, and the secondary RLC entity being associated with a second cell group different from the first cell group; and a transmitting unit, configured to submit a PDCP PDU to either the primary RLC entity or the secondary RLC entity if PDCP duplication of the radio bearer is deactivated and the total amount of PDCP data volume and data volume pending for initial transmission in the primary RLC entity and the secondary RLC entity is equal to or larger than a data transmission threshold ul-DataSplitThreshold, the data transmission threshold ul-DataSplitThreshold being configured for the UE by a base station through the RRC message.

According to a second aspect of the present disclosure, a method performed by a user equipment is provided, including: receiving an RRC message including a first indication and a second indication, the first indication indicating a first cell group and a first logical channel associated with a primary RLC entity of a radio bearer, the second indication indicating a second logical channel associated with a secondary RLC entity of the radio bearer, and the secondary RLC entity being associated with a second cell group different from the first cell group; and submitting a PDCP PDU to either the primary RLC entity or the secondary RLC entity if PDCP duplication of the radio bearer is deactivated and the total amount of PDCP data volume and data volume pending for initial transmission in the primary RLC entity and the secondary RLC entity is equal to or larger than a data transmission threshold ul-DataSplitThreshold, the data transmission threshold ul-DataSplitThreshold being configured for the UE by a base station through the RRC message.

According to a third aspect of the present disclosure, a base station is provided, including: a generation unit, configured to generate an RRC message including a first indication and a second indication, the first indication indicating a first cell group and a first logical channel associated with a primary RLC entity of a radio bearer, the second indication indicating a second logical channel associated with a secondary RLC entity of the radio bearer, and the secondary RLC entity being associated with a second cell group different from the first cell group; and a transmitting unit, configured to transmit the RRC message to user equipment, the transmitting unit further transmitting an RRC message including a data transmission threshold ul-DataSplitThreshold to the user equipment, the data transmission threshold being configured such that the user equipment submits a PDCP PDU to either the primary RLC entity or the secondary RLC entity if PDCP duplication of the radio bearer is deactivated and the total amount of PDCP data volume and data volume pending for initial transmission in the primary RLC entity and the secondary RLC entity is equal to or larger than the data transmission threshold.

According to a fourth aspect of the present disclosure, a method performed by a base station is provided, including: generating an RRC message including a first indication and a second indication, the first indication indicating a first cell group and a first logical channel associated with a primary RLC entity of a radio bearer, the second indication indicating a second logical channel associated with a secondary RLC entity of the radio bearer, and the secondary RLC entity being associated with a second cell group different from the first cell group; and transmitting the RRC message to the user equipment. The method further comprises: transmitting an RRC message including a data transmission threshold ul-DataSplitThreshold to the user equipment, the data transmission threshold being configured such that the user equipment submits a PDCP PDU to either the primary RLC entity or the secondary RLC entity if PDCP duplication of the radio bearer is deactivated and the total amount of PDCP data volume and data volume pending for initial transmission in the primary RLC entity and the secondary RLC entity is equal to or larger than the data transmission threshold.

Effect of Invention

According to the user equipment and the method thereof, and the base station and the method thereof in the present disclosure, an activation configuration of an appropriate PDCP duplication and/or RLC entity can be performed based on information indicating the activation configuration of the PDCP duplication and/or RLC entity, so as to improve the communication efficiency and reliability of a wireless communication system.

BRIEF DESCRIPTION OF DRAWINGS

The above and other features of the present disclosure will become more apparent with the following detailed description in conjunction with the accompanying drawings.

DETAILED DESCRIPTION

Figure 1:
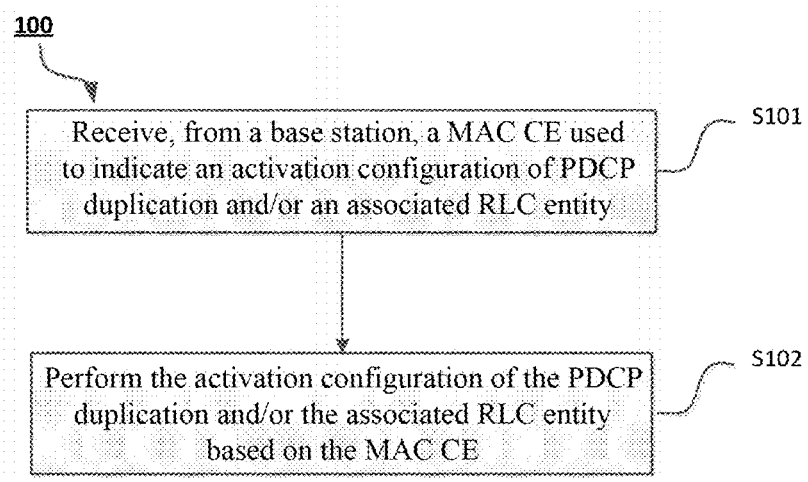
FIG. 1 shows a flowchart of a method 100 in user equipment (UE) based on an embodiment of the present disclosure.

The following describes the present disclosure in detail with reference to the accompanying drawings and specific embodiments. It should be noted that the present disclosure should not be limited to the specific embodiments described below. In addition, for simplicity, detailed description of the prior art not directly related to the present disclosure is omitted to prevent confusion in understanding the present disclosure.

Some terms related to the present disclosure are described below. Unless otherwise specified, the terms related to the present disclosure use the definitions herein.

RRC: Radio Resource Control.

PDCP: Packet Data Convergence Protocol.

RLC: Radio Link Control. The transmission mode of an RLC entity can be configured as one of a transparent mode (TM), an unacknowledged mode (UM), or an acknowledged mode (AM).

MAC: Medium Access Control.

MAC CE: MAC Control Element.

PDU: Protocol Data Unit.

SDU: Service Data Unit.

In the present disclosure, data received from or transmitted to an upper layer is referred to as an SDU, and data transmitted to or received from a lower layer is referred to as a PDU. For example, data received from or transmitted to an upper layer by a PDCP entity is referred to as a PDCP SDU; and data received from or transmitted to an RLC entity by the PDCP entity is referred to as a PDCP PDU (i.e., an RLC SDU). The PDCP PDU may be a PDCP control PDU or a PDCP data PDU.

PDCP-Config information element: the information element PDCP-Config is used to set configurable PDCP parameters for a signaling bearer and/or a data bearer.

RLC-BearerConfig information element: the information element RLC-BearerConfig is used to configure an RLC entity, a corresponding logical channel in MAC and the linking to a PDCP entity (served radio bearer).

MCG: Master Cell Group.

PCell: Primary Cell, which refers to an MCG cell that operates on the primary frequency, in which UE performs an initial connection establishment procedure or initiates a connection reestablishment procedure.

PSCell: Primary SCG Cell. In dual connectivity, UE is used to perform an SCG cell for random access in performing synchronization reconfiguration.

SCell: Secondary Cell, which refers to, for UE configured with CA, a cell used to provide additional radio resources on the basis of a special cell.

SCG: Secondary Cell Group, which refers to, for UE configured with dual connectivity, a subset of serving cell groups including a PSCell and 0 or more secondary cells.

SPCell: Special Cell. In dual connectivity, the special cell refers to a PCell of an MCG or a PSCell of an SCG, otherwise (i.e., in carrier aggregation), the special cell refers to a PCell of an MCG.

DC: Dual Connectivity.

CA: Carrier Aggregation.

DRB: data radio bearer carrying user plane data, or abbreviated to data radio bearer.

SRB: Signaling Radio Bearer.

Unless otherwise indicated, the bearer or radio bearer in the present disclosure may be an SRB, a DRB, a split DRB, and a split SRB.

PDCP duplication: also referred to as duplication, packet duplication or data duplication. An SRB, a DRB, a split SRB, and a split DRB may all be configured with the PDCP duplication. When a radio bearer is configured with the PDCP duplication, a secondary RLC entity and a secondary logical channel are added to the radio bearer to process duplicate PDCP PDUs. The PDCP duplication means that the same PDCP PDU is transmitted twice or many times, and the PDCP PDU transmitted twice or many times is transmitted by means of RLC entities and/or logical channels associated with different carriers or carrier groups. In a dual connectivity manner, the RLC entities and/or logical channels of radio bearers configured with the PDCP duplication belong to different MAC entities.

Duplication activation/deactivation MAC CE: duplication activation/deactivation MAC CE used to activate or deactivate PDCP duplication of a radio bearer.

Primary path: also referred to as a primary RLC entity used to transmit a PDCP control PDU and a PDCP data PDU, and the primary path is configured by an RRC message and cannot be deactivated.

In 3GPP release 15, in carrier aggregation, when PDCP duplication is deactivated, the PDCP entity transmits the PDCP PDU to the primary path. In dual connectivity, when PDCP duplication is deactivated, if a total data volume is less than a configured data split threshold, the PDCP entity transmits the PDCP PDU to the primary path. But in 3GPP release 16, in a dual connectivity scenario where there are more than two RLC entities associated with a DRB configured with PDCP duplication, a data transmitting mode after PDCP duplication deactivation may also be different from release 15. In a carrier aggregation scenario, the data transmitting mode may be the same as release 15 after PDCP duplication is deactivated.

Secondary path: a secondary path is associated with other RLC entities, other than the primary path, in RLC entities associated with a DRB configured with PDCP duplication.

A method in user equipment (UE) in the present disclosure is described below. Specifically, a control method involved in PDCP duplication of a bearer in the UE is described. As an example, FIG. 1 shows a flowchart of a method 100 in user equipment (UE) based on an embodiment of the present disclosure.

In step S101, user equipment (UE) (i.e., an MAC entity in UE) receives, from a base station, a single DRB duplication activation/deactivation MAC CE (referred to as a first MAC CE or an enhanced duplication activation/deactivation MAC CE). The single DRB duplication activation or deactivation MAC CE is used to indicate activation or deactivation of PDCP duplication of a DRB and/or activation or deactivation of an associated RLC entity (i.e., indicating whether a corresponding RLC entity is activated).

Example implementations of the first MAC CE are described below.

Figure 2:
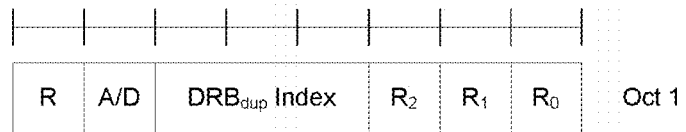
FIG. 2 shows a schematic diagram of a first MAC CE.

In one embodiment, the first MAC CE includes a DRBdup index field and a Ri field. The $DRB_{dup}$ index field indicates the DRB for which the MAC CE applies. Preferably, the value of the $DRB_{dup}$ index field is the ascending (or descending) order of the DRB ID among the DRBs configured with PDCP duplication and with RLC entity(ies) associated with this MAC entity. In other words, the value of the $DRB_{dup}$ index field is the ascending (or descending) order of the DRB ID among the DRBs configured with PDCP duplication and with associated RLC entities belonging to or associated with this MAC entity, having a predefined sequence starting number 0 or 1. For example, DRB1, DRB3 and DRB4 are configured with PDCP duplication and the three DRBs all have RLC entities associated with current MAC entity, and sequence numbers (i.e. the value of the $DRB_{dup}$ index field) corresponding to DRB1, DRB3 and DRB4 are 0, 1 and 2 (or 1, 2 and 3), respectively. Alternatively, the value of the $DRB_{dup}$ index field is a DRB ID. The Ri field indicates activation or deactivation of the corresponding RLC entity, or the Ri field indicates an activation/deactivation status of PDCP duplication of the corresponding RLC entity, and RLC entities correspond to R0, R1 and R2 respectively, in the ascending (or descending) order of RLC entity identities (other than the primary path). In addition, if the primary path is also indicated in the first MAC CE, the value of Ri corresponding to the primary path is always 1. For Ri fields to which no RLC entity is mapped, it may be specified or predefined that the value thereof is always 0 (or 1) or another predefined value. The UE will ignore those Ri to which no RLC entity is mapped. For example, assuming that DRB1 (or a PDCP entity thereof) configured with PDCP duplication is associated with RLC1, RLC2 and RLC3 and RLC1 is the primary path, RLC2 and RLC3 are mapped to R0 and R1, respectively, and no RLC entity is mapped to R2. FIG. 2 shows an example format of a first MAC CE.

Optionally, the first MAC CE further includes an A/D field used to indicate an activation/deactivation status of the PDCP duplication of the DRB indicated by the $DRB_{dup}$ index field. The A/D field is set to 1 to indicate that the PDCP duplication of the corresponding DRB is activated, and the A/D field is set to 0 to indicate that the PDCP duplication of the corresponding DRB is deactivated. Vice versa. Optionally, if the A/D field is set to 0, all the Ri fields are set to 0 (if Ri corresponding to the primary path is included in the first MAC CE, the value of Ri corresponding to the primary path is 1 but the value of another Ri is 0).

It should be noted that since there is a one-to-one mapping relationship between RLC entities and logical channels, an RLC entity may also be replaced with a logical channel in the embodiments of the present disclosure, and an RLC entity identity is correspondingly replaced with a logical channel identity.

In the embodiments of the present disclosure, if the base station configures one RLC identity unique to the DRB for each RLC entity associated with the DRB configured with PDCP duplication in the RRC message transmitted to the UE, the Ri field in the first MAC CE may directly correspond to the RLC identity, but if no RLC identity is configured, a corresponding relation between the Ri field and the RLC entity may be indicated according to the logical channel identity of the logical channel associated with the RLC entity. Since the logical channel identity is unique to MAC, in the case of DC, the UE configures two MAC entities, and a logical channel corresponding to a DRB configured with PDCP duplication may have the same value in two MACs. At the same time, the logical channel corresponds to Ri (i=0, 1, or 2 or i=0, 1, 2, or 3) in the ascending (or descending) order of the logical channel identity and in a way of MCG-ahead of-SCG (or MCG or SCG-first) (if present). For example, DRB1 is associated with logical channels LCID2 and LCID3 in the MCG and associated with logical channels LCID1 and LCID3 in the SCG. An RLC entity corresponding to MCG LCID2 is the primary RLC entity, and MCG LCID3, SCG LCID1 and SCG LCID3 are arranged in the ascending order in the way of MCG-ahead of-SCG, respectively corresponding to R0, R1 and R2.

Figure 7:
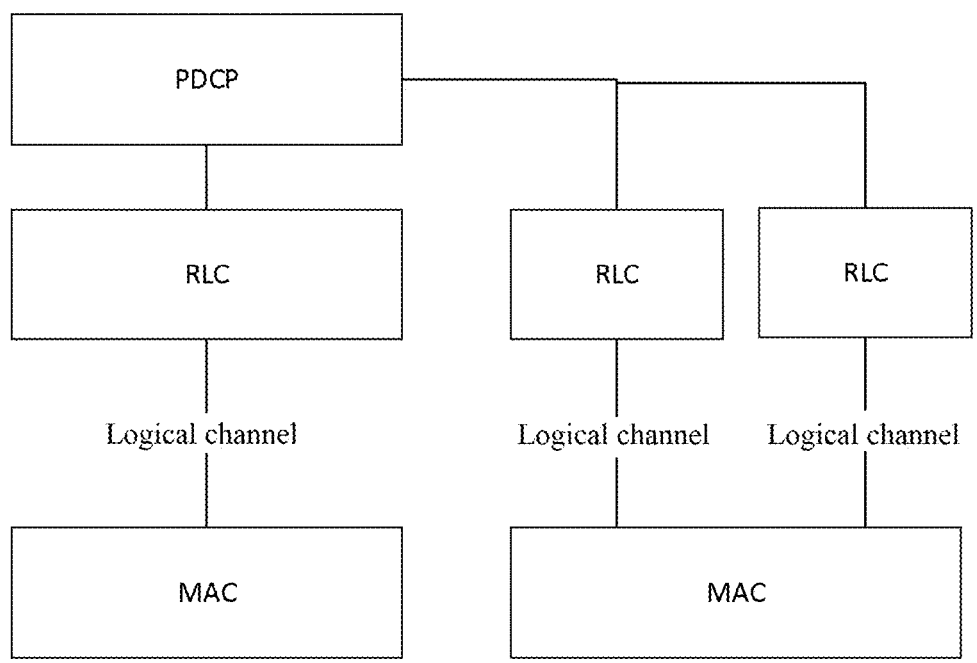
FIG. 7 shows a schematic diagram of a corresponding relation among a PDCP entity, an RLC entity, a logical channel, and a MAC entity.

FIG. 7 shows a corresponding relation among a PDCP entity, an RLC entity, a logical channel, and a MAC entity.

In step S102, user equipment (UE) (i.e. a MAC entity in UE) instructs an upper layer (e.g. a PDCP layer/entity) to activate or deactivate PDCP duplication and/or an associated RLC entity of a corresponding DRB based on the first MAC CE. Specifically, for each DRB configured with PDCP duplication, the MAC entity performs the following operations:

In one embodiment, if a first MAC CE for an RLC entity associated with a DRB configured with PDCP duplication is received and Ri is 0 (all RLC entities or secondary RLC entities are deactivated), an upper layer is instructed to deactivate the PDCP duplication of this DRB. Otherwise, the upper layer is instructed to activate the PDCP duplication of this DRB and/or the activated RLC entity(i.e. RLC entity corresponding to Ri=1).

In one embodiment, if a first MAC CE for an RLC entity associated with a DRB configured with PDCP duplication is received and at least one Ri is 1 (at least one RLC entity or at least one secondary RLC entity is activated), an upper layer is instructed to activate the PDCP duplication of this DRB and/or the activated RLC entity(i.e. RLC entity corresponding to Ri=1). Otherwise, the upper layer is instructed to deactivate the PDCP duplication of this DRB.

In one embodiment, if a first MAC CE for an RLC entity associated with a DRB configured with PDCP duplication is received and the PDCP duplication of the DRB is deactivated, an upper layer is instructed to deactivate the PDCP duplication of this DRB and/or the activated RLC entity (if present). Otherwise (i.e. if the PDCP duplication of the DRB is activated), the upper layer is instructed to activate the PDCP duplication of this DRB and/or the activated RLC entity (i.e. RLC entity corresponding to Ri=1).

In the embodiments of the present disclosure, the operation of MAC receiving the first MAC CE and indicating the activated RLC entity to the upper layer may be replaced by indicating a deactivated RLC entity to the upper layer. The deactivation of one RLC entity means that upon deactivation of one RLC entity, the PDCP entity does not submit a PDCP data PDU to this RLC entity.

In the present disclosure, the activated RLC entity may also be referred to as a PDCP duplication activated RLC entity, which refers to an RLC entity activated for transmitting the PDCP data PDU among a plurality of RLC entities associated with the PDCP entity. When PDCP duplication is activated, the PDCP entity duplicates the PDCP data PDU and submit the PDCP data PDU to the associated PDCP duplication activated RLC entity. It should be noted that in dual connectivity, if a split bearer data transmission mode is used after PDCP duplication is deactivated, there are two activated RLC entities (a primary RLC entity and a secondary RLC entity), but the secondary RLC entity activated at the same time is not for the purpose of PDCP duplication.

The following describes an embodiment of operations performed when UE receives a duplication activation/deactivation MAC CE (hereinafter referred to as a second MAC CE) defined by 3GPP release 15.

Figure 3:
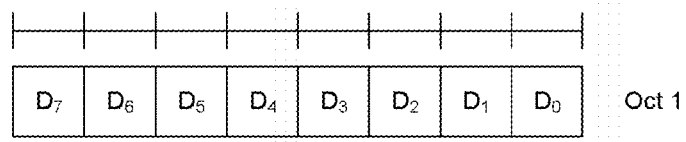
FIG. 3 shows a schematic diagram of a second MAC CE.

The second MAC CE may be specified or predefined only for deactivating PDCP duplication, and not for activating PDCP duplication, or, for a PDCP entity with more than two associated RLC entities, the UE ignores a value corresponding to Di=1. For a PDCP entity with two associated RLC entities, if Di=1, the MAC entity instructs the upper layer to activate PDCP duplication of the corresponding DRB. For a PDCP entity with two associated RLC entities, if Di=0, the MAC entity instructs the upper layer to deactivate PDCP duplication of the corresponding DRB. FIG. 3 shows an example format of a second MAC CE. A Di field indicates the activation/deactivation status of the PDCP duplication of DRB i where i is the ascending order of the DRB ID among the DRBs configured with PDCP duplication and with RLC entity(ies) associated with this MAC entity. The Di field is set to 0 to indicate that the PDCP duplication of DRB i shall be deactivated. The Di field is set to 1 to indicate that the PDCP duplication of DRB i shall be activated.

Specifically, for each DRB configured with PDCP duplication, the MAC entity performs the following operations:

In one embodiment, when Di=0 (i.e. the received second MAC CE deactivates the PDCP duplication of one DRB), the MAC entity instructs the upper layer to deactivate the PDCP duplication of this DRB. When Di=1 (i.e. the received second MAC CE activates the PDCP duplication of one DRB), if there are two or fewer associated RLC entities (RLC entities associated with this DRB or RLC entities associated with a PDCP entity corresponding to this DRB), the upper layer is instructed to activate the PDCP duplication of this DRB. Otherwise (i.e. if there are more than two associated RLC entities (RLC entities associated with this DRB or RLC entities associated with a PDCP entity corresponding to this DRB)), the UE does not instruct the upper layer (i.e. the UE does not perform any operation for a DRB corresponding to Di=1, in other words, this Di is ignored).

In one embodiment, when Di=0 (i.e. the received second MAC CE deactivates the PDCP duplication of a DRB corresponding to this Di), the MAC entity instructs the upper layer to deactivate the PDCP duplication of this DRB. When Di=1 (i.e. the received second MAC CE activates the PDCP duplication of the DRB corresponding to this Di) and the PDCP duplication of the corresponding DRB is currently activated, the upper layer is instructed to activate the PDCP duplication of this DRB and/or the upper layer is instructed to maintain the currently activated RLC entity. If Di=1 and the corresponding DRB is associated with two or fewer RLC entities, the upper layer is instructed to activate the PDCP duplication of this DRB.

In one embodiment, when Di=0 (i.e. the received second MAC CE deactivates the PDCP duplication of a DRB corresponding to this Di), the MAC entity instructs the upper layer to deactivate the PDCP duplication of this DRB. When Di=1 (i.e. the received second MAC CE activates the PDCP duplication of the DRB corresponding to this Di), the UE does not instruct the upper layer to activate the PDCP duplication of this DRB, (i.e. the UE does not perform any operation for a DRB corresponding to Di=1, in other words, this Di is ignored).

It may also be specified or predefined that if a DRB configured with PDCP duplication is configured (or associated) with only two RLCs, the second MAC CE is used to activate or deactivate the PDCP duplication. If three or more RLC entities are configured (or associated), the first MAC CE is used to activate or deactivate the PDCP duplication of the DRB and/or the associated RLC entity.

It may also be specified or predefined that, for a DRB corresponding to Di=1 in the received second MAC CE, regardless of whether the PDCP duplication of this DRB is currently activated or deactivated, the PDCP duplication of the corresponding DRB will be activated and the activated RLC configured in the RRC message will be used for the PDCP duplication of this DRB, i.e. a PDCP PDU is transmitted when the activated RLC entity configured in the RRC message is activated for the PDCP duplication of this DRB.

In the embodiments of the present disclosure, unless otherwise specified, the MAC entity instructing the upper layer refers to the MAC entity instructing the PDCP layer or the PDCP entity.

The following describes an embodiment in which a base station configures PDCP duplication bearer for user equipment.

In the first step, user equipment (UE) receives an RRC message from a base station, such as an RRC reconfiguration message. The RRC message includes one information element (IE) secondaryFallbackPath, indicating a secondary RLC entity or an activated secondary RLC entity or a fallback RLC entity which may be used or may transmit a PDCP PDU after PDCP duplication is deactivated (see the embodiment of operations performed by a transmitting PDCP entity for details). The value of the secondaryFallbackPath information element may be a logical channel identity of the secondary RLC entity or an LCID of the secondary RLC entity or an identity of a logical channel associated with the secondary RLC entity or an identity of the secondary RLC entity(denoted as an RLC ID), and a cell group corresponding to the logical channel identity or LCID is different from a cell group corresponding to the primary path. Since a 3GPP system currently only supports the case of configuring two cell groups MCG and SCG for the UE, a cell group identity CellGroupId corresponding to the MCG is 0, and a cell group identity CellGroupId corresponding to the SCG is 1. The information element primaryPath used to indicate the primary path included in the RRC message includes two information elements cellGroup IE and logicalChannel IE. The cellGroup IE is used to indicate a cell group where the primary path is located, the logicalChannel IE is used to indicate a logical channel or a logical channel identity in the cell group indicated in the cellGroup IE, and a cell group where the logical channel identity of the logical channel indicated by the secondaryFallbackPath is located is a cell group different from the primary path. If the primary path is in the MCG, the logical channel indicated by the secondaryFallbackPath is in the SCG and vice versa.

It may be specified or predefined that in DC, the secondaryFallbackPath must be configured if the number of RLC entities configured for/associated with DRBs configured with PDCP duplication in a cell group different from the cell group where the primary path is located is more than 1.

The following is an example description of the secondaryFallbackPath included in the PDCP-Config IE used to set configurable PDCP parameters for DRBs or SRBs:

```
-- ASN1START
-- TAG-PDCP-CONFIG-START
PDCP-Config ::=    SEQUENCE   {
    drb                                         SEQUENCE  {
        discardTimer                                ENUMERATED {ms10, ms20, ms30, ms40, ms50, ms60, ms75, ms100,
ms150, ms200,
                                                        ms250, ms300, ms500, ms750, ms1500, infinity} OPTIONAL,
-- Cond Setup
        pdcp-SN-SizeUL                              ENUMERATED      {len12bits,      len18bits}
OPTIONAL,    -- Cond Setup2
        pdcp-SN-SizeDL                              ENUMERATED      {len12bits,      len18bits}
OPTIONAL,    -- Cond Setup2
        headerCompression                           CHOICE   {
            notUsed                                     NULL,
            rohc                                        SEQUENCE   {
                maxCID                                      INTEGER   (1..16383)         DEFAULT 15,
                profiles                                    SEQUENCE {
                    profile0x0001                                   BOOLEAN,
                    profile0x0002                                   BOOLEAN,
                    profile0x0003                                   BOOLEAN,
                    profile0x0004                                   BOOLEAN,
                    profile0x0006                                   BOOLEAN,
                    profile0x0101                                   BOOLEAN,
                    profile0x0102                                   BOOLEAN,
                    profile0x0103                                   BOOLEAN,
                    profile0x0104                                   BOOLEAN
                },
                drb-ContinueROHC                            ENUMERATED { true }         OPTIONAL,
-- Need N
            },
            uplinkOnlyROHC                              SEQUENCE {
                maxCID                                      INTEGER (1..16383)          DEFAULT 15,
                profiles                                    SEQUENCE {
                    profile0x0006                                   BOOLEAN
                },
                drb-ContinueROHC                            ENUMERATED { true }         OPTIONAL,
-- Need N
            },
            ...
        },
        integrityProtection                         ENUMERATED { enabled }      OPTIONAL,
-- Cond ConnectedTo5GC1
        statusReportedRequired                      ENUMERATED { true }         OPTIONAL,
-- Cond Rlc-AM
        outOfOrderDelivery                          ENUMERATED { true }         OPTIONAL,
-- Need R
    }                                           OPTIONAL, --
Cond DRB
    moreThanOneRLC                          SEQUENCE  {
        primaryPath                                 SEQUENCE   {
            cellGroup                                   CellGroupId                 OPTIONAL,
-- Need R
            logicalChannel                              LogicalChannelIdentity      OPTIONAL
-- Need R
        },
        ul-DataSplit Threshold                                                  UL-DataSplitThreshold
OPTIONAL, -- Cond SplitBearer
        pdcp-Duplication                            BOOLEAN                     OPTIONAL
-- Need R
    }                                           OPTIONAL, --
Cond MoreThanOneRLC
    t-Reordering                                ENUMERATED {
                                                    ms0, ms1, ms2, ms4, ms5, ms8, ms10, ms15, ms20, ms30,
                                                    ms40, ms50, ms60, ms80, ms100, ms120, ms140, ms160,
                                                    ms180, ms200, ma220, ms240, ms260, ms280, ms300, ms500,
                                                    ms750, ms1000, ms1250, ms1500, ms1750, ms2000, ms2250,
                                                    ms2500, ms2750, ms3000, spare28, spare27, spare26,
```

```
                        spare25, spare24, spare23, spare22, spare21, spare20,
                        spare19, spare18, spare17, spare16, spare15, spare14,
                        spare13, spare12, spare11, spare10, spare09, spare08,
                        spare07, spare06, spare05, spare04, spare03, spare02,
                        spare01 }                                          OPTIONAL, --
Need S
    ...,
    [[
    cipheringDisabled           ENUMERATED { true }           OPTIONAL,
-- Cond ConnectedTo5GC
    ]]
    secondaryFallbackpath       SEQUENCE {
        logicalChannel          LogicalChannelIdentity
    }                                                         OPTIONAL -- Cond
MoreThanTwoRLC,
}
UL-DataSplit Threshold ::=      ENUMERATED {
                                b0, b100, b200, b400, b800, b1600,
b3200, b6400, b12800, b25600, b51200, b102400, b204800,
                                b409600, b819200, b1223800, b1638400,
b2457600, b3276800, b4096000, b4915200, b5734400,
                                b6553600, infinity, spare0, spare 7,
spare6, spare5, spare4, spare3, spare2, spare1 }
-- TAG-PDCP-CONFIG-STOP
-- ASN1STOP
```

In the above example description, the secondaryFallbackPath information element includes a logicalChannel information element or an RLC entity identity information element (the RLC entity identity information element is used to indicate the fallback RLC entity), or the value of the secondaryFallbackPath information element is a logical channel identity LogicalChannelIdentity or an RLC entity identity.

The secondaryFallbackPath information element (abbreviated as information element) may also be included in the RLC-BearerConfig information element, and configured for the UE by the base station through an RRC message. Preferably, the value of the secondary FallbackPath may be TRUE or False or 1 or 0. When the value is TRUE or 1 or the secondaryFallbackPath occurs, after the PDCP duplication is deactivated, the secondary RLC entity indicated by the secondaryFallbackPath of the primary RLC entity is used as a data transmission path of the DRB, and the PDCP PDU is transmitted according to the method in the embodiment defined by the operation performed by the transmitting PDCP entity. Alternatively, the value of the secondaryFallbackPath may be a value used to indicate that the corresponding RLC entity is in an activated status (denoted as Activated), a value used to indicate that the corresponding RLC entity is in a deactivated status (denoted as Deactivated), or a value used to indicate whether the corresponding RLC entity is used as one of the fallback paths (denoted as FallbackPath) after the PDCP duplication is deactivated. The fallback path is the secondary RLC entity when transmitting the PDCP PDU according to the method in the embodiment defined by the operation performed by the transmitting PDCP entity after the PDCP duplication is deactivated.

It may be specified or predefined that, in DC configured with carrier aggregation, if there is more than one RLC entity in a cell group different from the cell group where the primary RLC entity is located, one secondaryFallbackPath must be configured in the cell group different from the cell group where the primary RLC entity is located.

In the second step, user equipment (UE) establishes/adds/reconfigures a corresponding DRB based on the RRC message.

The following describes an operation performed by the transmitting PDCP entity.

The transmitting PDCP entity performs the following operations when submitting a PDCP PDU to the lower layer.

If the transmitting PDCP entity is associated with one RLC entity, the transmitting PDCP entity submits the PDCP PDU to the associated RLC entity.

If the transmitting PDCP entity is associated with at least two RLC entities, if the PDCP duplication is activated and if the PDCP PDU is a PDCP data PDU, this PDCP data PDU is duplicated and submitted to the activated RLC entity.

If the transmitting PDCP entity is associated with at least two RLC entities, if the PDCP duplication is activated and if the PDCP PDU is a PDCP control PDU, the PDCP control PDU is submitted to the primary RLC entity.

If the transmitting PDCP entity is associated with at least two RLC entities, if the PDCP duplication is deactivated, if the transmitting PDCP entity is associated with two RLC entities and these two RLC entities belong to different cell groups, and if the total amount of PDCP data volume and RLC data volume pending for initial transmission in these two RLC entities is equal to or larger than ul-DataSplitThreshold, this PDCP PDU is submitted to the primary RLC entity or the secondary RLC entity. The ul-DataSplitThreshold is a parameter configured by the RRC message.

If the transmitting PDCP entity is associated with at least two RLC entities, if the PDCP duplication is deactivated, if the transmitting PDCP entity is associated with two RLC entities and these two RLC entities belong to different cell groups, and if the total amount of PDCP data volume and RLC data volume pending for initial transmission in these two RLC entities is less than ul-DataSplitThreshold, this PDCP PDU is submitted to the primary RLC entity.

If the PDCP duplication is deactivated, if the transmitting PDCP entity is associated with more than two RLC entities, if the secondaryFallbackPath is configured, and if the total amount of PDCP data volume and data volume pending for initial transmission in the primary RLC entity and the RLC entity indicated by the secondaryFallbackPath is equal to or larger than ul-DataSplitThreshold, this PDCP PDU is submitted to the primary RLC entity or the RLC entity indicated by the secondary FallbackPath.

If the PDCP duplication is deactivated, if the transmitting PDCP entity is associated with more than two RLC entities, if the secondaryFallbackPath is configured, and if the total amount of PDCP data volume and data volume pending for initial transmission in the primary RLC entity and the RLC entity indicated by the secondaryFallbackPath is less than ul-DataSplitThreshold, this PDCP PDU is submitted to the primary RLC entity.

If the PDCP duplication is deactivated, if the transmitting PDCP entity is associated with more than two RLC entities, and if no secondaryFallbackPath is configured, this PDCP PDU is submitted to the primary RLC entity.

It may also be specified or predefined that if the PDCP duplication is deactivated, if the transmitting PDCP entity is associated with more than two RLC entities, if no secondaryFallbackPath is configured, if an activated secondary RLC entity indicated by a MAC layer is received, and if the total amount of PDCP data volume and data volume pending for initial transmission in the primary RLC entity and the activated secondary RLC entity indicated by the MAC layer is equal to or larger than ul-DataSplitThreshold, this PDCP PDU is submitted to the primary RLC entity or the activated secondary RLC entity indicated by the MAC layer.

It may also be specified or predefined that if the PDCP duplication is deactivated, if the transmitting PDCP entity is associated with more than two RLC entities, if no secondaryFallbackPath is configured, if an activated secondary RLC entity indicated by a MAC layer is received, and if the total amount of PDCP data volume and data volume pending for initial transmission in the primary RLC entity and the activated secondary RLC entity indicated by the MAC layer is less than ul-DataSplitThreshold, this PDCP PDU is submitted to the primary RLC entity.

It may also be specified or predefined that if the PDCP duplication is deactivated, if the transmitting PDCP entity is associated with more than two RLC entities, if no secondaryFallbackPath is configured, and if an activated secondary RLC entity indicated by a MAC layer is not received, this PDCP PDU is submitted to the primary RLC entity.

According to the method performed by the user equipment, an activation configuration of appropriate PDCP duplication and/or RLC entity can be performed based on information indicating the activation configuration of the PDCP duplication and/or RLC entity received from the base station, so as to improve the communication efficiency and reliability of a wireless communication system.

Figure 4:
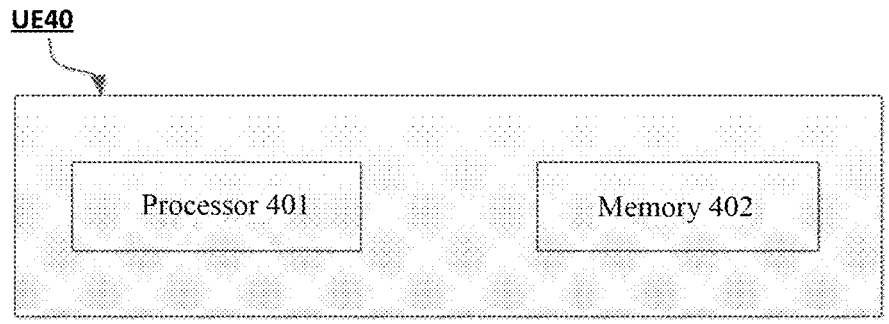
FIG. 4 shows a block diagram of user equipment 40 based on an embodiment of the present disclosure.

In addition, FIG. 4 shows a block diagram of user equipment 40 according to an embodiment of the present disclosure. As shown in FIG. 4, the user equipment 40 includes a processor 401 and a memory 402. The processor 401 may include, for example, a microprocessor, a microcontroller, an embedded processor, and the like. The memory 402 may include, for example, a volatile memory (for example, a random access memory (RAM)), a hard disk drive (HDD), a non-volatile memory (for example, a flash memory), or other memory systems. The memory 402 stores program instructions. The instructions, when run by the processor 401, may execute the method in user equipment described in detail in the present disclosure.

Figure 5:
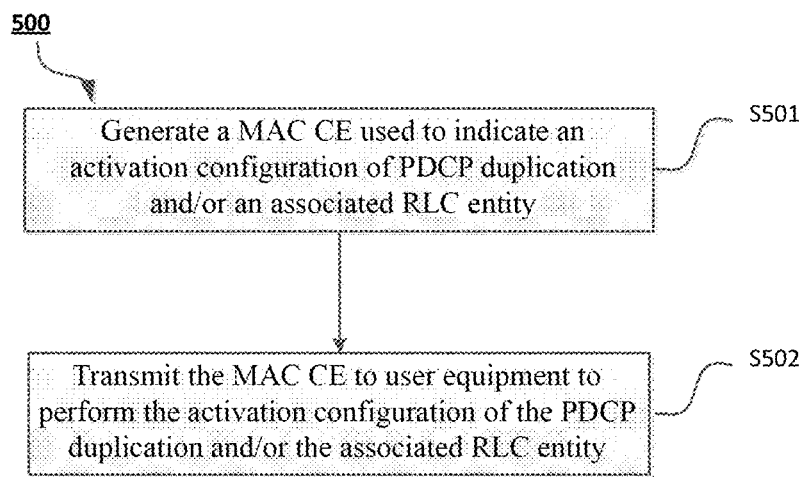
FIG. 5 shows a flowchart of a method 500 in a base station based on an embodiment of the present disclosure.

Furthermore, as an example, FIG. 5 shows a flowchart of a method 500 in a base station based on an embodiment of the present disclosure. In step S501, a MAC CE, used to indicate an activation configuration of PDCP duplication and/or an associated RLC entity of a DRB, is generated. In step S502, the MAC CE is transmitted to user equipment to perform the activation configuration of the PDCP duplication and/or the associated RLC entity of the user equipment based on the MAC CE.

According to the method performed by the base station, an activation configuration of appropriate PDCP duplication and/or a RLC entity can be performed based on information indicating the activation configuration of the PDCP duplication and/or RLC entity transmitted to the user equipment, so as to improve the communication efficiency and reliability of a wireless communication system.

Figure 6:
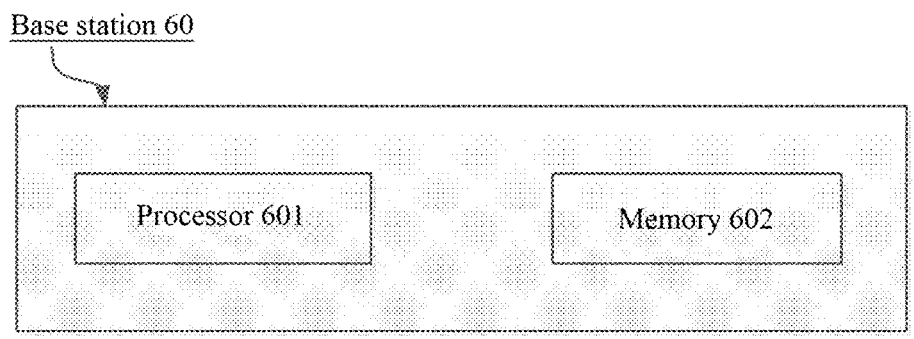
FIG. 6 shows a block diagram of a base station 60 based on an embodiment of the present disclosure.

In addition, FIG. 6 shows a block diagram of a base station 60 according to an embodiment of the present disclosure. As shown in FIG. 6, the base station 60 includes a processor 601 and a memory 602. As mentioned above, the base station 60 in the present disclosure may be any type of base station, including but not limited to: a Node B or an enhanced base station eNB, or may be a base station gNB in a 5G communication system, or a micro base station, a pico base station, a macro base station, a home base station, and the like. The processor 601 may include, for example, a microprocessor, a microcontroller, an embedded processor, and the like. The memory 602 may include, for example, a volatile memory (for example, a random access memory (RAM)), a hard disk drive (HDD), a non-volatile memory (for example, a flash memory), or other memory systems. The memory 602 stores program instructions. The instructions, when run by the processor 601, may execute the method in a base station described in detail in the present disclosure.

The computer-executable instructions or program running on the device according to the present disclosure may be a program that enables the computer to implement the functions of the embodiments of the present disclosure by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The computer-executable instructions or program for implementing the functions of the embodiments of the present disclosure may be recorded on a computer-readable storage medium. The corresponding functions may be achieved by reading programs recorded on the recording medium and executing them by the computer system. The phrase "computer system" herein may be a computer system embedded in the device, which may include operating systems or hardware (e.g., peripherals). The "computer-readable storage medium" may be a semiconductor recording medium, an optical recording medium, a magnetic recording medium, a short-time dynamic memory program recording medium, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications may be made to the present disclosure within the scope of the claims. Embodiments resulted from the appropriate combinations of the technical means disclosed in different embodiments are also included within the technical scope of the present disclosure. In addition, components with the same effect described in the above embodiments may be replaced with one another.

The invention claimed is:

1. User equipment comprising:
   receiving circuitry configured to receive an RRC message which includes
   (i) a first indication used to indicate a first cell group and a first logical channel identity of a primary RLC entity,
   (ii) a second indication used to indicate a second logical channel identity of a secondary RLC entity, and
   (iii) a ul-DataSplitThreshold parameter, wherein
   the secondary RLC entity belongs to a second cell group that is different from the first cell group,
   the secondary RLC entity is an RLC entity for a fallback path,
   the receiving circuitry is configured to receive a third indication and a fourth indication, wherein
   the third indication indicates whether a PDCP duplication is activated, and
   the fourth indication indicates whether the PDCP duplication is activated for the secondary RLC entity; and
   transmitting circuitry configured to submit a PDCP PDU to either the primary RLC entity or the secondary RLC entity, if the PDCP duplication is deactivated and a total amount of PDCP data volume and RLC data volume pending for initial transmission in the primary RLC entity and the secondary RLC entity is equal to or larger than the ul-DataSplitThreshold parameter.

2. A method performed by user equipment, comprising:
   receiving an RRC message which includes
   (i) a first indication used to indicate a first cell group and a first logical channel identity of a primary RLC entity,
   (ii) a second indication used to indicate a second logical channel identity of a secondary RLC entity, and
   (iii) a ul-DataSplitThreshold parameter, wherein
   the secondary RLC entity belongs to a second cell group that is different from the first cell group, and
   the secondary RLC entity is an RLC entity for a fallback path;
   receiving a third indication and a fourth indication, wherein the third indication indicates whether a PDCP duplication is activated, and the fourth indication indicates whether the PDCP duplication is activated for the secondary RLC entity; and
   submitting a PDCP PDU to either the primary RLC entity or the secondary RLC entity, if the PDCP duplication is deactivated and a total amount of PDCP data volume and RLC data volume pending for initial transmission in the primary RLC entity and the secondary RLC entity is equal to or larger than the ul-DataSplitThreshold parameter.

3. A base station comprising:
   transmitting circuitry configured to transmit, to user equipment (UE), an RRC message which includes
   (i) a first indication used to indicate a first cell group and a first logical channel identity of a primary RLC entity,
   (ii) a second indication used to indicate a second logical channel identity of a secondary RLC entity, and
   (iii) a ul-DataSplitThreshold parameter, wherein
   the secondary RLC entity belongs to a second cell group that is different from the first cell group,
   the secondary RLC entity is an RLC entity for a fallback path,
   the transmitting circuitry is configured to transmit a third indication and a fourth indication, wherein the third indication indicates whether a PDCP duplication is activated, and the fourth indication indicates whether the PDCP duplication is activated for the secondary RLC entity, and
   the RRC message causes the UE to submit a PDCP PDU to either the primary RLC entity or the secondary RLC entity, if the PDCP duplication is deactivated and a total amount of PDCP data volume and RLC data volume pending for initial transmission in the primary RLC entity and the secondary RLC entity is equal to or larger than the ul-DataSplitThreshold parameter.

* * * * *